(12) United States Patent
Qiu et al.

(10) Patent No.: US 12,283,854 B2
(45) Date of Patent: Apr. 22, 2025

(54) MOTOR, COMPRESSOR AND REFRIGERATION DEVICE

(71) Applicant: ANHUI MEIZHI PRECISION MANUFACTURING CO., LTD., Anhui (CN)

(72) Inventors: Xiaohua Qiu, Anhui (CN); Dejin Zhang, Anhui (CN); Chao Chen, Anhui (CN); Sen Yang, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 375 days.

(21) Appl. No.: 17/554,083

(22) Filed: Dec. 17, 2021

(65) Prior Publication Data

US 2022/0109357 A1 Apr. 7, 2022

Related U.S. Application Data

(63) Continuation of application No. PCT/CN2020/100761, filed on Jul. 8, 2020.

(30) Foreign Application Priority Data

May 26, 2020 (CN) .......................... 202010457453.2

(51) Int. Cl.
*H02K 21/16* (2006.01)
*F25B 31/02* (2006.01)
(Continued)

(52) U.S. Cl.
CPC ........... *H02K 21/16* (2013.01); *F25B 31/026* (2013.01); *H02K 1/02* (2013.01); *H02K 1/276* (2013.01); *H02K 2213/03* (2013.01)

(58) Field of Classification Search
CPC .......... H02K 21/16; H02K 1/02; H02K 1/276
See application file for complete search history.

(56) References Cited

U.S. PATENT DOCUMENTS

| | | | | |
|---|---|---|---|---|
| 8,987,965 | B2* | 3/2015 | Kobayashi | H02K 1/276 310/156.43 |
| 11,025,113 | B2* | 6/2021 | Dlala | H02K 15/03 |

(Continued)

FOREIGN PATENT DOCUMENTS

| | | |
|---|---|---|
| CN | 1574546 A | 2/2005 |
| CN | 203632511 U | 6/2014 |

(Continued)

OTHER PUBLICATIONS

Notice of Reasons for Refusal dated Sep. 12, 2023 received in Japanese Patent Application No. JP 2021-571617.

(Continued)

*Primary Examiner* — Robert W Horn
(74) *Attorney, Agent, or Firm* — Scully, Scott, Murphy & Presser, P.C.

(57) ABSTRACT

A motor, a compressor and a refrigeration device are provided. The motor has a stator and a rotor. The stator has a stator core and a winding. The stator core is provided with multiple stator protruding teeth. The winding are wound on the teeth. The rotor has a rotor core and a permanent magnet. The permanent magnet is arranged on the rotor core. A ratio of the number of the stator protruding teeth to the number of phases of the winding is adaptable to adjust the strength of a demagnetization reverse magnetic field generated by energizing the winding.

7 Claims, 3 Drawing Sheets

(51) Int. Cl.
    *H02K 1/02*      (2006.01)
    *H02K 1/276*     (2022.01)

(56) References Cited

U.S. PATENT DOCUMENTS

| | | | |
|---|---|---|---|
| 11,228,214 B2 * | 1/2022 | Ishikawa | H02K 1/276 |
| 11,600,417 B2 * | 3/2023 | Qiao | H01F 7/02 |
| 11,949,290 B2 * | 4/2024 | Shimokawa | H02K 1/02 |
| 2009/0200885 A1 | 8/2009 | Kikuchi et al. | |
| 2012/0223600 A1 * | 9/2012 | Tonogi | H02K 1/148 |
| | | | 310/46 |
| 2015/0171676 A1 | 6/2015 | Kobayashi et al. | |
| 2018/0248426 A1 | 8/2018 | Nigo et al. | |
| 2019/0089215 A1 * | 3/2019 | Ishikawa | H02K 21/14 |
| 2020/0244121 A1 * | 7/2020 | Takahashi | H02K 15/03 |
| 2020/0273612 A1 * | 8/2020 | Qiao | H01F 7/02 |
| 2020/0412190 A1 * | 12/2020 | Dlala | H01F 1/086 |
| 2022/0109338 A1 * | 4/2022 | Chen | H02K 15/03 |
| 2022/0109357 A1 * | 4/2022 | Qiu | H02K 1/2766 |

FOREIGN PATENT DOCUMENTS

| | | |
|---|---|---|
| CN | 205544648 U | 8/2016 |
| CN | 107408850 A | 11/2017 |
| CN | 107707051 A | 2/2018 |
| CN | 207612139 U | 7/2018 |
| CN | 108616178 A | 10/2018 |
| CN | 108886276 A | 11/2018 |
| CN | 210120439 U | 2/2020 |
| CN | 111066220 A | 4/2020 |
| CN | 111082548 A | 4/2020 |
| JP | 2006187189 A | 7/2006 |
| JP | 2007306798 A | 11/2007 |
| JP | 2009071910 A | 4/2009 |
| JP | 2011223864 A | 11/2011 |
| JP | 2011258961 A | 12/2011 |
| WO | 2013008284 A1 | 1/2013 |
| WO | 2014167714 A1 | 10/2014 |
| WO | 2015166544 A1 | 11/2015 |
| WO | 2017072967 A1 | 5/2017 |
| WO | 2018198866 A1 | 11/2018 |
| WO | 2019062130 A1 | 4/2019 |
| WO | WO-2020003414 A1 * | 1/2020 ............... H02K 1/02 |

OTHER PUBLICATIONS

Notice of Reasons for Refusal dated Jan. 4, 2023 received in Japanese Patent Application No. JP 2021-571617.
Notice of Reasons for Refusal dated May 9, 2023 received in Japanese Patent Application No. JP 2021-571617.
International Search Report dated Mar. 3, 2021 received in International Application No. PCT/CN2020/100761 together with an English langague translation.
First Office Action dated Jan. 4, 2021 received in Chinese Patent Application No. CN 202010457453.2 together with an English language translation.
Wang, X., "Hysteresis loop", Electrical technology and applications, Dec. 31, 2012, p. 104, together with an English language abstract.
Second Office Action dated May 24, 2021 received in Chinese Patent Application No. CN 202010457453.2 together with an English language translation.
Request for the Submission of an Opinion dated Jul. 10, 2023 received in Korean Patent Application No. KR 10-2021-7039037.
Hanselman, D., "Chapter 10: Examples", Brushless Permanent Magnet Motor Design, Jan. 1, 2006, pp. 229-334.
Supplementary European Search Report dated Aug. 12, 2022 received in European Patent Application No. EP 20936078.3.
Request for the Submission of an Opinion dated Jan. 26, 2024 received in Korean Patent Application No. KR 10-2021-7039037.
Request for the Submission of an Opinion dated Sep. 22, 2024 received in Korean Patent Application No. 10-2021-7039037.

* cited by examiner

MOTOR, COMPRESSOR AND REFRIGERATION DEVICE

CROSS-REFERENCE TO RELATED APPLICATIONS

The present application is a continuation application of PCT International Application No. PCT/CN2020/100761, filed on Jul. 8, 2020, which claims priority to and benefits of Chinese Patent Application No. 202010457453.2, filed with China National Intellectual Property Administration on May 26, 2020 and entitled "Motor, Compressor And Refrigeration Device", the entire contents of which are herein incorporated by reference for all purposes. No new matter has been introduced.

FIELD

The present disclosure relates to the technical field of refrigeration devices, and particularly relates to a motor, a compressor and a refrigeration device.

BACKGROUND

At present, in the field of air conditioner compressors, variable-frequency motors have become the mainstream technology, especially in the situation where with the promulgation of the new Chinese National Standards of Energy Efficiency Grades for household air conditioners in 2019, fixed-speed motors have been gradually withdrawn from the market, and the era of variable-frequency motors has arrived. In order to adapt to the application environment of household air conditioners, the permanent magnets of variable-frequency motors are mostly neodymium iron boron permanent magnets containing heavy rare earth elements and having relatively high intrinsic coercivity. However, as the total quantity of variable-frequency motors is increasing every year, the consumption of national strategic resources of heavy rare earth elements (especially dysprosium and terbium) is also increasing every year. In order to reduce the consumption of the strategic resources, studies need to be conducted on the application of heavy rare earth-free neodymium iron boron permanent magnets. However, studies have shown that a reduction in the content of heavy rare earth in the permanent magnet will result in a decrease of 40% or more in the anti-demagnetization ability of the motor. Therefore, how to improve the anti-demagnetization ability of the motor has become an urgent problem to be solved at present.

SUMMARY

The present disclosure aims to solve one of the technical problems existing in the prior art or the related art.

To this end, a first aspect of the present disclosure proposes a motor.

A second aspect of the present disclosure proposes a compressor.

A third aspect of the present disclosure proposes a refrigeration device.

In view of this, an embodiment of the first aspect of the present disclosure proposes a motor, comprising: a stator, comprising a stator core and a winding, the stator core being provided with a plurality of stator protruding teeth, and the winding being wound on the plurality of stator protruding teeth; and a rotor, comprising a rotor core and a permanent magnet, the permanent magnet being arranged on the rotor core, wherein a ratio of the number of the stator protruding teeth to the number of phases of the winding is adapted to adjust the strength of a demagnetization reverse magnetic field generated by energizing the winding.

The motor proposed by this embodiment comprises a stator and a rotor. The stator comprises a stator core and a winding. The stator core is provided with a plurality of stator protruding teeth, and the winding is wound on the plurality of stator protruding teeth. The rotor comprises a rotor core and a permanent magnet. The permanent magnet is arranged on the rotor core. The strength of the demagnetization reverse magnetic field generated by energizing the winding is adjusted. In other words, the strength of the reverse magnetic field generated by energizing the winding, which demagnetizes the permanent magnet, is adjusted by configuring the ratio of the number of the stator protruding teeth to the number of the phases of the winding. For example, the number of the stator protruding teeth is increased as compared with the related art, while the number of effective turns in series of the winding is kept unchanged, to increase the ratio of the number of the stator protruding teeth to the number of the phases of the winding, so that the number of winding turns in series on each stator protruding tooth is reduced as compared with the related art, so as to effectively reduce the strength of the demagnetization reverse magnetic field generated by energizing the winding. In this way, despite the lack of heavy rare earth elements such as dysprosium and terbium in the permanent magnet, the demagnetization reverse magnetic field generated by energizing the winding can still be reduced by increasing the ratio of the number of the stator protruding teeth to the number of the phases of the winding, such that the demagnetization reverse magnetic field is insufficient to demagnetize the permanent magnet. As a result, the overall anti-demagnetization ability of the motor can be improved; and a motor, that not only satisfies the reduction of heavy rare earth elements but also ensures the anti-demagnetization ability of the motor, can be provided.

In addition, the motor in the above embodiment provided according to the present disclosure may also have the following additional technical features.

In an alternative embodiment, the ratio of the number of the stator protruding teeth to the number of the phases of the winding is greater than or equal to 4.

In the related art, the ratio of the number of the stator protruding teeth to the number of the phases of the winding is generally 3. However, in this embodiment, by making the ratio of the number of the stator protruding teeth to the number of the phases of the winding greater than or equal to 4, the number of the winding turns in series on each stator protruding tooth can be effectively reduced, thereby effectively reducing the strength of the demagnetization reverse magnetic field generated by energizing the winding, so that the demagnetization reverse magnetic field is insufficient to demagnetize the permanent magnet, which improves the overall anti-demagnetization ability of the motor.

In an alternative embodiment, the ratio of the number of the stator protruding teeth to the number of the phases of the winding is smaller than or equal to 6.

In this embodiment, the ratio of the number of the stator protruding teeth to the number of the phases of the winding can be smaller than or equal to 6, so that the motor can be suitable for most compressor products, which avoids that the number of the stator protruding teeth is excessively large or the number of the phases of the winding is excessively small to affect the use of the motor, and even affect the use of the compressor using the motor.

In other fields, such as the aerospace field, the ratio of the number of the stator protruding teeth to the number of the phases of the winding can also be configured to be greater than or equal to 6, and even up to 10, 15 and so on, according to actual needs.

In an alternative embodiment, the number of the stator protruding teeth is greater than or equal to 12, and the number of the phases of the winding is 3.

In this embodiment, the number of the phases of the winding is 3, which is suitable for the motors required by most compressor products. By making the number of the stator protruding teeth greater than or equal to 12, the number of the winding turns in series on each stator protruding tooth can be effectively reduced, thereby effectively reducing the strength of the demagnetization reverse magnetic field generated by energizing the winding, so that the demagnetization reverse magnetic field is insufficient to demagnetize the permanent magnet, which improves the overall anti-demagnetization ability of the motor.

Further, the number of the stator protruding teeth is a multiple of 3, such as 12, 15 or 18.

In an alternative embodiment, the mass percentage of dysprosium and/or terbium in the permanent magnet ranges from 0 to 0.5%, or the mass percentage of heavy rare earth elements in the permanent magnet ranges from 0 to 0.5%.

In this embodiment, since dysprosium and terbium are heavy rare earth elements which are national strategic resources, by limiting the range of the mass percentage of dysprosium and/or terbium in the permanent magnet to be 0 to 0.5%, and/or limiting the range of the mass percentage of heavy rare earth elements in the permanent magnet to be 0 to 0.5%, it is beneficial to reducing the use of heavy rare earth elements such as dysprosium and terbium and reducing the consumption of strategic resources, while ensuring good anti-demagnetization ability of the motor, which therefore helps reduce the manufacturing cost of the motor and improve the cost performance of the motor.

In an alternative embodiment, the intrinsic coercivity of the permanent magnet at 20° C. is smaller than or equal to 1800 kA/m.

In order to meet the requirement of household air conditioners for demagnetization current, the intrinsic coercivity of neodymium iron boron permanent magnets used in the related art at 20° C. is mostly not smaller than 1830 kA/m, and the permanent magnets with this intrinsic coercivity all contain heavy rare earth elements, especially the elements dysprosium and terbium. By configuring the intrinsic coercivity of the permanent magnet at 20° C. to be smaller than or equal to 1800 kA/m, sufficient conditions are provided for reducing the mass percentage of heavy rare earth elements, such as dysprosium and/or terbium, in the permanent magnet, which is conducive to reducing the mass percentage of heavy rare earth elements in the permanent magnet, while ensuring the anti-demagnetization ability of the motor.

Further, the intrinsic coercivity of the permanent magnet at 20° C. ranges from 1500 kA/m to 1800 kA/m. This, on the one hand, avoids that the intrinsic coercivity of the permanent magnet at 20° C. is smaller than 1500 kA/m, which causes the anti-demagnetization ability of the motor to be excessively low, and on the other hand, provides sufficient conditions for reducing the mass percentage of heavy rare earth elements in the permanent magnet, such as dysprosium and/or terbium, which is conducive to reducing the mass percentage of heavy rare earth elements in the permanent magnet, and can even enable the permanent magnet to be free of heavy rare earth elements.

In an alternative embodiment, the winding is a concentrated winding set. In each phase of the winding, the windings distributed on different stator protruding teeth are connected in series or in parallel with each other.

In this embodiment, the winding is provided as a concentrated winding set. In each phase of the winding, the windings distributed on different stator protruding teeth can be connected in series or in parallel with each other, which can be configured according to needs, and the strength of the reverse magnetic field generated by energizing the windings, which demagnetizes the permanent magnet, can be adjusted accordingly.

In an alternative embodiment, the rotor core is provided with a mounting groove, and the permanent magnet is arranged in the mounting groove. Further, a cross section of the mounting groove is V-shaped.

In this embodiment, the rotor core is provided with a mounting groove and the permanent magnet is arranged in the mounting groove; and compared with the related art in which the permanent magnet is attached to the rotor core, this configuration is beneficial to improving the mounting firmness of the permanent magnet. In addition, by making the cross section of the mounting groove V-shaped, the permanent magnet in the mounting groove can be distributed in a V shape, which is beneficial to enhancing the anti-demagnetization ability of the motor, and is beneficial to enabling the anti-demagnetization ability of the motor using a permanent magnet free of heavy rare earth to be not lower than the anti-demagnetization ability of the motor using a permanent magnet containing heavy rare earth in the related art.

In an alternative embodiment, the stator is located on the outer circumference of the rotor, and a ratio of an inner diameter of the rotor to an outer diameter of the stator is greater than or equal to 0.11.

At present, in order to meet the requirement of compressors to improve energy efficiency and reduce the friction loss of mechanical compression components, the diameter of the motion shaft matching the inner diameter of the rotor is gradually reduced; but in the case where the outer diameter of the motor is fixed, relatively small change in the overall mass of the rotor and relatively small diameter of the motion shaft will bring forth the problems of reduced service life and increased noise. In this embodiment, by making the ratio of the inner diameter of the rotor to the outer diameter of the stator greater than or equal to 0.11, on the one hand, the inner diameter of the rotor will not be overly small, thereby ensuring the service life of the motor and reducing the noise of the motor; and on the other hand, the outer diameter of the stator will not be overly large, so that the overall change of the rotor located on the inner side of the stator will not be overly large, which further ensures the service life of the motor and reduces the noise of the motor. As for the magnitude of the outer diameter of the rotor and the magnitude of the inner diameter of the stator, they can be adjusted according to the energy efficiency requirements of the compressor, so that there is a sufficient gap between the stator and the rotor, thereby reducing friction loss.

In an alternative embodiment, the ratio of the inner diameter of the rotor to the outer diameter of the stator is smaller than or equal to 0.18.

In this embodiment, the ratio of the inner diameter of the rotor to the outer diameter of the stator is smaller than or equal to 0.18, which, on the one hand, can effectively avoid that the inner diameter of the rotor is overly large, resulting in an excessive increase in the friction loss of the motor and a decrease in the energy efficiency of the compressor; and on the one hand, can effectively avoid that the outer diameter of the stator is overly small, resulting in a relatively small overall mass of the rotor located on the inner side of the stator, thereby causing the problems of reduced service life and increased noise in the motor.

The second aspect of the present disclosure proposes a compressor, comprising the motor in any one of the above embodiments.

The compressor proposed in the present disclosure comprises the motor in any one of the above embodiments, and therefore has the beneficial effects of any one of the above embodiments, which will not be repeated here.

Further, the compressor also comprises a casing, a crankshaft and a cylinder, the motor being arranged in the casing, the crankshaft being connected to the rotor of the motor, and one end of the crankshaft being further connected to the cylinder to drive the cylinder to make a compression movement.

The third aspect of the present disclosure proposes a refrigeration device, comprising the compressor in any one of the above embodiments.

The refrigeration device proposed in the present disclosure comprises the compressor of any one of the above embodiments, and therefore has the beneficial effects of any one of the above embodiments, which will not be repeated here.

Further, the refrigeration device also comprises an evaporator and a condenser, the condenser being connected to an air outlet of the compressor, and the evaporator being connected to an air inlet of the compressor.

Further, the refrigeration device is an air conditioner or a refrigerator.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings, in which.

Figure 1:
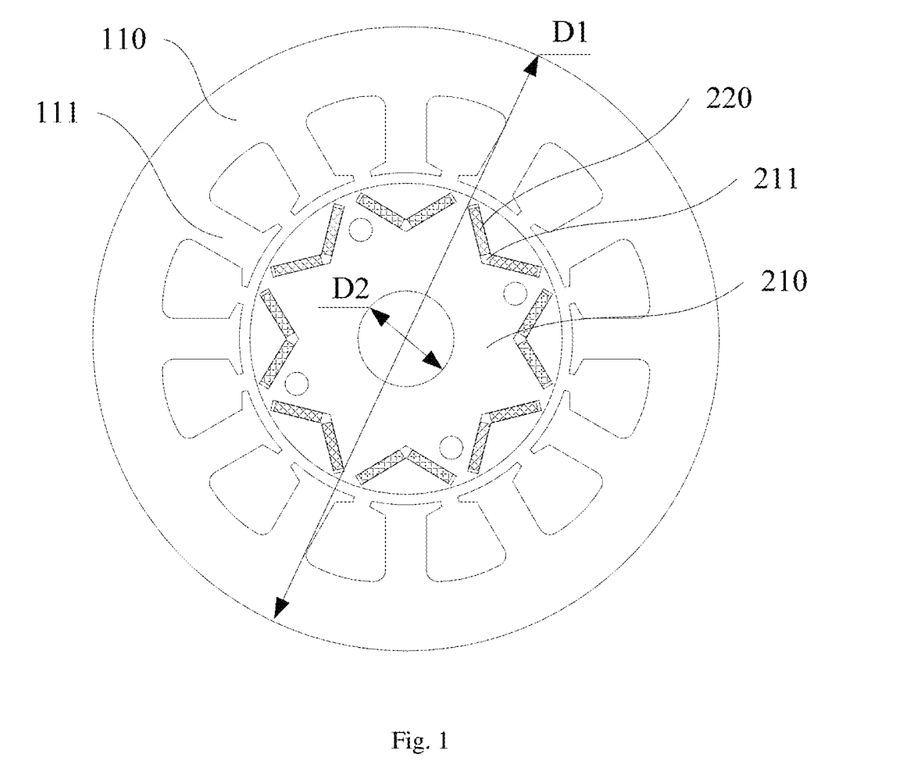
FIG. 1 is a schematic structural diagram of a motor according to an embodiment of the present disclosure.
Figure 2:
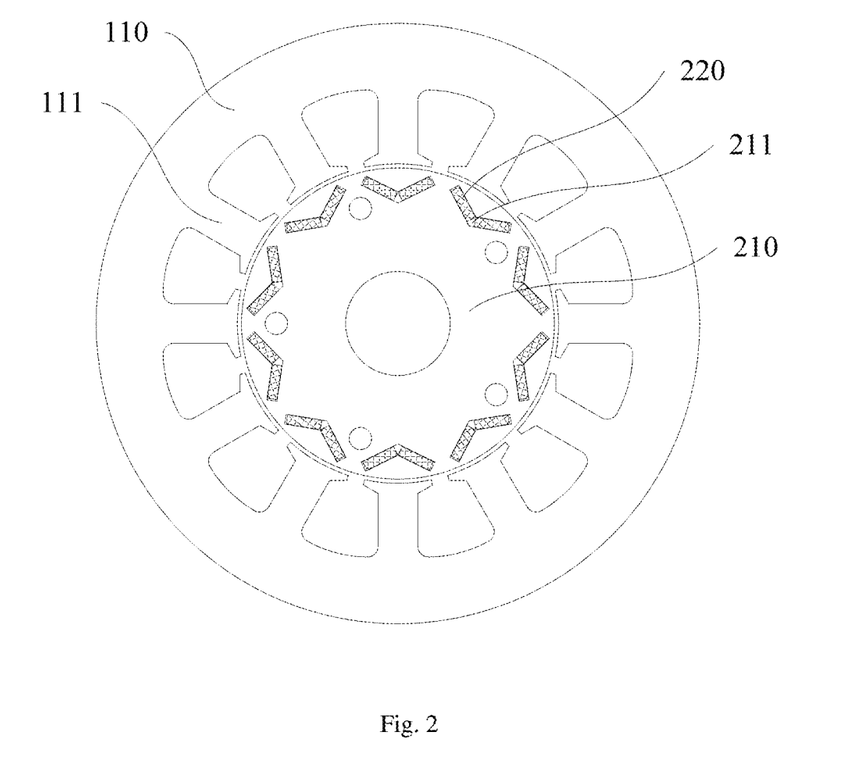
FIG. 2 is another schematic structural diagram of the motor according to an embodiment of the present disclosure.

The corresponding relationship between the reference signs and component names in FIG. 1 and FIG. 2 is as follows:

110 stator core; 111 stator protruding tooth; 210 rotor core; 211 mounting groove; and 220 permanent magnet.

DETAILED DESCRIPTION OF EMBODIMENTS

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Figure 3:
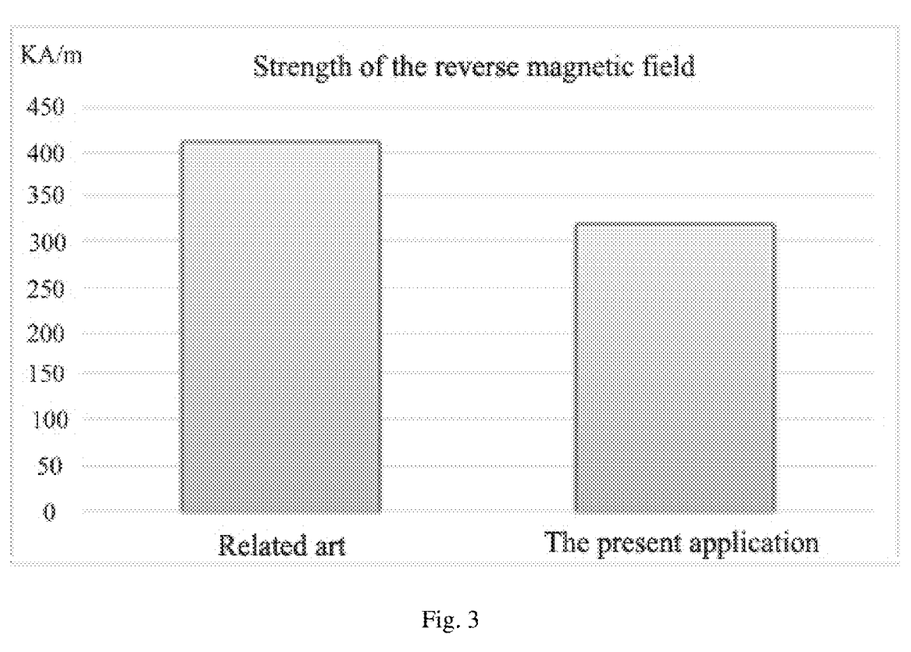
FIG. 3 is a diagram of comparison of the strength of the demagnetization reverse magnetic field generated by energization between a motor according to an embodiment of the present disclosure and a motor in the related art.

A motor according to some embodiments of the present disclosure is described below with reference to FIG. 1 to FIG. 3.

As shown in FIG. 1 and FIG. 2, a motor according to an exemplary embodiment comprises a stator and a rotor. The stator comprises a stator core 110 and a winding (not shown in the figures). The stator core 110 is provided with a plurality of stator protruding teeth 111, and the winding is wound on the plurality of stator protruding teeth 111. The rotor comprises a rotor core 210 and a permanent magnet 220. The permanent magnet 220 is arranged on the rotor core 210. The ratio of the number of the stator protruding teeth 111 to the number of the phases of the winding is configured to be adapted to adjust the strength of a demagnetization reverse magnetic field generated by energizing the winding.

For the motor proposed by the present disclosure, the strength of the demagnetization reverse magnetic field generated by energizing the winding is adjusted, i.e., the strength of the reverse magnetic field generated by energizing the winding, which demagnetizes the permanent magnet 220, is adjusted, by configuring the ratio of the number of the stator protruding teeth 111 to the number of the phases of the winding. For example, the number of the stator protruding teeth 111 is increased as compared with the related art, while the number of the effective turns in series of the winding is kept unchanged, to increase the ratio of the number of the stator protruding teeth 111 to the number of the phases of the winding, so that the number of the winding turns in series on each stator protruding tooth 111 is reduced as compared with the related art. In this way, in the case where the winding is fed with a demagnetization current of the same magnitude as that of the demagnetization current in the related art, the strength of the demagnetization reverse magnetic field generated by energizing the winding can be effectively reduced, so that despite the lack of heavy rare earth elements such as dysprosium and terbium in the permanent magnet 220, the demagnetization reverse magnetic field generated by energizing the winding can still be reduced by increasing the ratio of the number of the stator protruding teeth 111 to the number of the phases of the winding, such that the demagnetization reverse magnetic field is insufficient to demagnetize the permanent magnet 220. As a result, the overall anti-demagnetization ability of the motor can be improved; and a motor, which not only satisfies the reduction of heavy rare earth elements but also ensures the anti-demagnetization ability of the motor can be provided. Applicability of motor products can be consequently improved.

For example, the motor of the compressor in a household air conditioner is generally a three-phase motor, so the number of the stator protruding teeth 111 needs to be greater than or equal to 12. The case where the number of the stator protruding teeth 111 is 12 is taken as an example. As for the motor shown in FIG. 1, the number of the stator protruding teeth 111 is 12, the number of mounting grooves 211 for mounting the permanent magnet 220 is 8, and the number of the phases of the winding is 3. As for the motor shown in FIG. 2, the number of the stator protruding teeth 111 is 12, the number of the mounting grooves 211 for mounting the permanent magnet 220 is 10, and the number of the phases of the winding is 3. For the motors in the embodiments shown in FIG. 1 and FIG. 2, the number of the stator protruding teeth 111 is increased as compared with the related art, in which the number of the stator protruding teeth 111 is 9 by default and the number of the phases of the winding is 3 by default, and if the mass percentage of heavy rare earth elements in the permanent magnet 220 is smaller than or equal to 0.5%, the anti-demagnetization ability of the motor will drop by 40% or more. However, based on testing, it has been discovered unexpectedly that, as shown in FIG. 3, in the case where the winding is fed with a current of the same magnitude as that of the demagnetization current of the motor in the related art, the strength of the demagnetization reverse magnetic field generated by the winding of the present disclosure will be reduced by 20% or more as compared with the related art, which greatly improves the anti-demagnetization ability of the motor, and is therefore beneficial to matching the permanent magnet 220 with no or few heavy rare earth elements and matching the permanent magnet 220 with relatively low intrinsic coercivity so as to propose a motor that not only satisfies the reduction of heavy rare earth elements, but also ensures the anti-demagnetization ability of the motor.

Further, the ratio of the number of the stator protruding teeth 111 to the number of the phases of the winding is greater than or equal to 4. In the related art, the ratio of the number of the stator protruding teeth 111 to the number of the phases of the winding is generally 3. By making the ratio of the number of the stator protruding teeth 111 to the number of the phases of the winding greater than or equal to 4, the number of the winding turns in series on each stator protruding tooth 111 can be effectively reduced, thereby effectively reducing the strength of the demagnetization reverse magnetic field generated by energizing the winding, so that the demagnetization reverse magnetic field is insufficient to demagnetize the permanent magnet 220, which improves the overall anti-demagnetization ability of the motor. For example, the ratio of the number of the stator protruding teeth 111 to the number of the phases of the winding may be 4, 5 or 6.

Further, the ratio of the number of the stator protruding teeth 111 to the number of the phases of the winding is smaller than or equal to 6. The ratio of the number of the stator protruding teeth 111 to the number of the phases of the winding can be smaller than or equal to 6, so that the motor can be suitable for most compressor products, which avoids that the number of the stator protruding teeth 111 is excessively large or the number of the phases of the winding is excessively small to affect the use of the motor, and even affect the use of the compressor using the motor.

In other fields, such as the aerospace field, the ratio of the number of the stator protruding teeth 111 to the number of the phases of the winding can also be configured to be greater than or equal to 6, and even up to 10, 15 and so on, according to actual needs.

Further, the number of the stator protruding teeth 111 is greater than or equal to 12, and the number of the phases of the winding is 3. The number of the phases of the winding is specifically configured to be 3, which is suitable for the motors required by most compressor products. By making the number of the stator protruding teeth 111 greater than or equal to 12, the number of the winding turns in series on each stator protruding tooth 111 can be effectively reduced, thereby effectively reducing the strength of the demagnetization reverse magnetic field generated by energizing the winding, so that the demagnetization reverse magnetic field is insufficient to demagnetize the permanent magnet 220, which improves the overall anti-demagnetization ability of the motor.

In an exemplary embodiment, the number of the stator protruding teeth 111 is 12, and the number of the phases of the winding is 3.

In another exemplary embodiment, the number of the stator protruding teeth 111 is 15, and the number of the phases of the winding is 3.

In a further exemplary embodiment, the number of the stator protruding teeth 111 is 18, and the number of the phases of the winding is 3.

According to another exemplary embodiment, it is further limited that the mass percentage of dysprosium and/or terbium in the permanent magnet 220 ranges from 0 to 0.5%, or the mass percentage of heavy rare earth elements in the permanent magnet 220 ranges from 0 to 0.5%.

In this embodiment, since dysprosium and terbium are heavy rare earth elements which are national strategic resources, by limiting the range of the mass percentage of dysprosium and/or terbium in the permanent magnet 220 to be 0 to 0.5%, and/or limiting the range of the mass percentage of heavy rare earth elements in the permanent magnet 220 to be 0 to 0.5%, it is beneficial to reducing the use of heavy rare earth elements such as dysprosium and terbium and reducing the consumption of strategic resources, while ensuring satisfactory anti-demagnetization ability of the motor, which therefore helps reduce the manufacturing cost of the motor and improve the cost performance of the motor.

In an exemplary embodiment, the mass percentage of dysprosium and/or terbium in the permanent magnet 220 is 0, or the mass percentage of heavy rare earth elements in the permanent magnet 220 is 0.

In another exemplary embodiment, the mass percentage of dysprosium and/or terbium in the permanent magnet 220 is 0.11%, or the mass percentage of heavy rare earth elements in the permanent magnet 220 is 0.11%.

In a further exemplary embodiment, the mass percentage of dysprosium and/or terbium in the permanent magnet 220 is 0.35%, or the mass percentage of heavy rare earth elements in the permanent magnet 220 is 0.35%.

It can be understood that the mass percentage of heavy rare earth elements in the permanent magnet 220 can also be other values. For example, the mass percentage of heavy rare earth elements in the permanent magnet 220 is 0.005%, 0.01%, 0.025%, and so on. The heavy rare earth elements can also include other elements that can be components of the permanent magnet 220.

Further, the permanent magnet 220 is a neodymium iron boron permanent magnet. The neodymium iron boron permanent magnet has excellent magnetic properties and can meet the requirements of use in the motor. It can be understood that the permanent magnet 220 can also be any other permanent magnet 220 that meets the requirements.

According to another exemplary embodiment, it is further limited that the intrinsic coercivity of the permanent magnet 220 at 20° C. is smaller than or equal to 1800 kA/m.

In order to meet the requirement of household air conditioners for demagnetization current, in the related art, the intrinsic coercivity of neodymium iron boron permanent magnets 220 used by the compressor manufacturers in variable-frequency motors at 20° C. is greater than or equal to 1830 kA/m, and the permanent magnets 220 with this intrinsic coercivity all contain heavy rare earth elements, especially the elements dysprosium and terbium. In order to reduce dependence on heavy rare earth elements, permanent magnets 220 free of heavy rare earth are even used, and as a result, the intrinsic coercivity of the permanent magnets 220 will drop to 1800 kA/m or less. Due to the reduction in intrinsic coercivity, for the motors in the related art (it is listed here that the motors in the related art have a slot-pole match of 9 slots and 6 poles), the demagnetization ability will be reduced by 40% or more.

Furthermore, the intrinsic coercivity of the permanent magnet 220 at 20° C. is configured to be smaller than or equal to 1800 kA/m. This configuration, on the one hand, provides sufficient conditions for reducing the mass percentage of heavy rare earth elements, such as dysprosium and/or terbium, in the permanent magnet 220; and on the other hand, when combined with the ratio of the number of the stator protruding teeth 111 to the number of the phases of the winding, is conducive to reducing the mass percentage of heavy rare earth elements in the permanent magnet 220, while ensuring the anti-demagnetization ability of the motor, so as to propose a motor that not only satisfies the reduction of heavy rare earth elements, but also ensures the anti-demagnetization ability of the motor.

Further, the intrinsic coercivity of the permanent magnet 220 at 20° C. ranges from 1500 kA/m to 1800 kA/m. This, on the one hand, avoids that the intrinsic coercivity of the permanent magnet 220 at 20° C. is smaller than 1500 kA/m, which causes the anti-demagnetization ability of the motor to be excessively low, and on the other hand, provides sufficient conditions for reducing the mass percentage of heavy rare earth elements in the permanent magnet 220, such as dysprosium and/or terbium, which is conducive to reducing the mass percentage of heavy rare earth elements in the permanent magnet 220, and can even enable the permanent magnet 220 to be free of heavy rare earth elements.

According to another exemplary embodiment, it is further limited that the winding is a concentrated winding set. In each phase of the winding, the windings distributed on different stator protruding teeth 111 are connected in series or in parallel with each other.

In this embodiment, the winding is configured as a concentrated winding set. In each phase of the winding, the windings distributed on different stator protruding teeth 111 can be connected in series or in parallel with each other, which can be designed according to needs, and the strength of the reverse magnetic field generated by energizing the windings, which demagnetizes the permanent magnet 220, can be adjusted accordingly.

According to another exemplary embodiment, as shown in FIG. 1 and FIG. 2, it is further limited that the rotor core 210 is provided with a mounting groove 211, and the permanent magnet 220 is arranged in the mounting groove 211. By providing a mounting groove 211 on the rotor core 210 and arranging the permanent magnet 220 in the mounting groove 211, it helps improve the mounting firmness of the permanent magnet 220, as compared with the related art in which the permanent magnet 220 is attached to the rotor core 210.

Further, as shown in FIG. 1 and FIG. 2, a cross section of the mounting groove 211 is V-shaped. The permanent magnet 220 in the mounting groove 211 can be distributed in a V shape, which is beneficial to enhancing the anti-demagnetization ability of the motor, and is beneficial to enabling the anti-demagnetization ability of the motor using a permanent magnet 220 free of heavy rare earth to be not lower than the anti-demagnetization ability of the motor using a permanent magnet 220 containing heavy rare earth in the related art.

Alternatively, the cross section of the mounting groove 211 is W-shaped or U-shaped.

According to another exemplary embodiment, as shown in FIG. 1, it is further limited that the stator is located on the outer circumference of the rotor, and a ratio of an inner diameter D2 of the rotor to an outer diameter D1 of the stator is greater than or equal to 0.11.

At present, in order to meet the requirement of compressors to improve energy efficiency and reduce the friction loss of mechanical compression components, the diameter of the motion shaft matching the inner diameter of the rotor is gradually reduced; however in the case where the outer diameter of the motor is fixed, relatively small change in the overall mass of the rotor and relatively small diameter of the motion shaft will bring forth the problems of reduced service life and increased noise. In this embodiment, based on the analysis of strength, by making the ratio of the inner diameter D2 of the rotor to the outer diameter D1 of the stator greater than or equal to 0.11, on the one hand, the inner diameter D2 of the rotor will not be overly small, thereby ensuring the service life of the motor and reducing the noise of the motor; and on the other hand, the outer diameter D1 of the stator will not be overly large, so that the overall change of the rotor located on the inner side of the stator will not be overly large, which further ensures the service life of the motor and reduces the noise of the motor. As for the magnitude of the outer diameter of the rotor and the magnitude of the inner diameter of the stator, they can be adjusted according to the energy efficiency requirements of the compressor, so that there is a sufficient gap between the stator and the rotor, thereby reducing friction loss.

Further, the ratio of the inner diameter D2 of the rotor to the outer diameter D1 of the stator is smaller than or equal to 0.18. Making the ratio of the inner diameter D2 of the rotor to the outer diameter D1 of the stator smaller than or equal to 0.18 can, on the one hand, effectively avoid that the inner diameter D2 of the rotor is overly large, resulting in an excessive increase in the friction loss of the motor and a decrease in the energy efficiency of the compressor; and on the one hand, effectively avoid that the outer diameter D1 of the stator is overly small, resulting in a relatively small overall mass of the rotor located on the inner side of the stator, thereby causing the problems of reduced service life and increased noise in the motor.

According to another exemplary embodiment, a compressor comprising the motor in any one of the above embodiments is provided. The compressor proposed in the present disclosure comprises the motor in any one of the above embodiments, and therefore has the beneficial effects of any one of the above embodiments, which will not be repeated here.

Further, the compressor also comprises a casing, a crankshaft and a cylinder, the motor being arranged in the casing, the crankshaft being connected to the rotor of the motor, and one end of the crankshaft being further connected to the cylinder to drive the cylinder to make a compression movement.

According to another exemplary embodiment, a refrigeration device comprising the compressor in any one of the above embodiments is provided. The refrigeration device proposed in the present disclosure comprises the compressor of any one of the above embodiments, and therefore has the beneficial effects of any one of the above embodiments, which will not be repeated here.

Further, the refrigeration device also comprises an evaporator and a condenser, the condenser being connected to an air outlet of the compressor, and the evaporator being connected to an air inlet of the compressor.

Further, the refrigeration device is an air conditioner or a refrigerator.

In the present disclosure, the term "a plurality of" means two or more, unless otherwise explicitly defined. The terms "mounting", "connected", "connection", "fixing" and the like should all be understood in a broad sense, for example, "connection" may be a fixed connection, and may also be a removable connection, or an integral connection; and "connected" may refer to direct connection and may also refer to indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A motor comprising:
    a stator comprising a stator core and a three-phase winding, the stator core comprising 15 or 18 stator protruding teeth, and the three-phase winding being wound on the stator protruding teeth; and
    a rotor comprising a rotor core, 8 or 10 poles, and a plurality of permanent magnets, the permanent magnets being arranged on the rotor core,
    wherein the rotor core is provided with a plurality of mounting grooves,
    wherein the permanent magnets are arranged in the mounting grooves,
    wherein a cross section of each of the mounting grooves is V-shaped,
    wherein the stator is located on an outer circumference of the rotor, and
    wherein a ratio of an inner diameter of the rotor to an outer diameter of the stator is greater than or equal to 0.11.

2. The motor according to claim 1, wherein:
    a mass percentage of dysprosium and/or terbium in the permanent magnets ranges from 0 to 0.5%; or
    a mass percentage of heavy rare earth elements in the permanent magnets ranges from 0 to 0.5%.

3. The motor according to claim 1, wherein an intrinsic coercivity of the permanent magnets at 20° C. is smaller than or equal to 1800 kA/m.

4. The motor according to claim 3, wherein the intrinsic coercivity of the permanent magnets at 20° C. ranges from 1500 kA/m to 1800 kA/m.

5. The motor according to claim 1, wherein:
    the three-phase winding is a concentrated winding set; and
    in each phase of the three-phase winding, the windings distributed on different stator protruding teeth are connected in series or in parallel with each other.

6. The motor according to claim 1, wherein the ratio of the inner diameter of the rotor to the outer diameter of the stator is smaller than or equal to 0.18.

7. The motor according to claim 1, wherein a number of the stator protruding teeth is based on a desired demagnetization reverse magnetic field produced by energizing the three-phase winding.

* * * * *